(12) United States Patent
Li

(10) Patent No.: US 11,029,545 B2
(45) Date of Patent: Jun. 8, 2021

(54) THIN FILM TRANSISTOR LIQUID CRYSTAL DISPLAY (TFT-LCD) AND THE DRIVING CIRCUIT AND SWITCHING POWER SUPPLY THEREOF

(71) Applicant: SHENZHEN CHINA STAR OPTOELECTRONICS TECHNOLOGY CO., LTD., Guangdong (CN)

(72) Inventor: Yuntao Li, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 103 days.

(21) Appl. No.: 16/083,391

(22) PCT Filed: Jul. 6, 2018

(86) PCT No.: PCT/CN2018/094775
§ 371 (c)(1),
(2) Date: Sep. 7, 2018

(87) PCT Pub. No.: WO2019/218443
PCT Pub. Date: Nov. 21, 2019

(65) Prior Publication Data
US 2020/0341310 A1    Oct. 29, 2020

(30) Foreign Application Priority Data
May 18, 2018 (CN) .......................... 201810481375.2

(51) Int. Cl.
*G02F 1/133*     (2006.01)
*G02F 1/1368*    (2006.01)
(Continued)

(52) U.S. Cl.
CPC ........ *G02F 1/13306* (2013.01); *G02F 1/1368* (2013.01); *G09G 3/3648* (2013.01);
(Continued)

(58) Field of Classification Search
CPC .. G02F 1/13306; G02F 1/1368; H02M 3/156; G09G 3/3648; G09G 2310/08; G09G 2330/021
See application file for complete search history.

(56) References Cited

U.S. PATENT DOCUMENTS 6,204,649 B1 * 3/2001 Roman ................... H02M 1/12
323/282
6,737,843 B2 * 5/2004 Kanakubo ............. H02M 3/156
323/282
(Continued)

FOREIGN PATENT DOCUMENTS

CN    205725448 U    11/2016
CN    107112899 A    8/2017
(Continued)

*Primary Examiner* — Grant Sitta
(74) *Attorney, Agent, or Firm* — Leong C. Lei

(57) ABSTRACT

The present disclosure relates to a TFT-LCD and the driving circuit and the switching power supply thereof. The switching power supply includes a PWM controller, an electronic signal generator, and a field effect transistor. The output pins of the electronic signal generator being configured to output voltage signals that vary periodically between multiple voltage ranges. The frequency selection pins of the PWM controller and the output pins of the electronic signal generator are connected to receive the voltage signals from the electronic signal generator, and the PWM controller outputs switching signals of a predetermined frequency through at least one output pin according to a voltage range of the voltage signals received by the frequency selection pins. A
(Continued)

gate pin of the FET connects to output pins of the PWM controller, and a source pin of the FET is grounded.

13 Claims, 1 Drawing Sheet

(51) Int. Cl.
  G09G 3/36 (2006.01)
  H02M 3/156 (2006.01)
(52) U.S. Cl.
  CPC ........ H02M 3/156 (2013.01); *G09G 2310/08* (2013.01); *G09G 2330/021* (2013.01)

(56) References Cited

U.S. PATENT DOCUMENTS

| | | | | |
|---|---|---|---|---|
| 7,190,143 B2* | 3/2007 | Wei | ........... | H02M 7/219 |
| | | | | 318/606 |
| 7,268,526 B1* | 9/2007 | Smith | ........... | H02M 3/156 |
| | | | | 323/284 |
| 7,550,957 B2* | 6/2009 | Ishii | ........... | H02M 3/1563 |
| | | | | 323/282 |
| 8,258,768 B2* | 9/2012 | McPhalen | ........... | H02M 1/44 |
| | | | | 323/283 |
| 8,270,185 B2* | 9/2012 | Hu | ........... | H02M 3/33507 |
| | | | | 363/21.13 |
| 8,294,445 B2* | 10/2012 | Kwok | ........... | H04B 15/00 |
| | | | | 323/283 |
| 8,929,430 B2* | 1/2015 | Jain | ........... | H04L 25/4902 |
| | | | | 375/238 |
| 9,014,637 B1* | 4/2015 | Skinner | ........... | H04W 52/241 |
| | | | | 455/63.1 |
| 9,526,137 B1* | 12/2016 | Wang | ........... | H02M 3/04 |
| 10,110,126 B2* | 10/2018 | Childs | ........... | H02M 3/156 |
| 10,284,087 B2* | 5/2019 | Tateishi | ........... | H02M 3/157 |
| 2003/0137341 A1* | 7/2003 | LeChevalier | ........... | G09G 3/3216 |
| | | | | 327/536 |
| 2007/0041224 A1* | 2/2007 | Moyse | ........... | H02M 3/157 |
| | | | | 363/21.01 |
| 2009/0237049 A1* | 9/2009 | Hachiya | ........... | H02M 3/156 |
| | | | | 323/282 |
| 2010/0102740 A1* | 4/2010 | Hong | ........... | H05B 41/32 |
| | | | | 315/239 |
| 2013/0234682 A1* | 9/2013 | Yoon | ........... | H03K 5/15013 |
| | | | | 323/234 |
| 2013/0328534 A1* | 12/2013 | Hsieh | ........... | G05F 3/02 |
| | | | | 323/271 |
| 2014/0266084 A1* | 9/2014 | Fan | ........... | H02M 3/156 |
| | | | | 323/222 |
| 2014/0327421 A1* | 11/2014 | Arao | ........... | H05B 45/14 |
| | | | | 323/282 |
| 2016/0364595 A1* | 12/2016 | Du | ........... | G06K 9/0002 |
| 2017/0099011 A1* | 4/2017 | Freeman | ........... | H02M 1/44 |
| 2017/0162142 A1* | 6/2017 | Wu | ........... | G09G 3/3648 |
| 2017/0187278 A1* | 6/2017 | Yamaguchi | ........... | H03K 17/082 |
| 2017/0222636 A1* | 8/2017 | Zhang | ........... | H02M 1/44 |
| 2018/0019654 A1* | 1/2018 | Higashi | ........... | H02M 1/14 |
| 2018/0123450 A1* | 5/2018 | Moon | ........... | H02M 1/00 |
| 2019/0393796 A1* | 12/2019 | Fukushima | ........... | H02M 1/32 |

FOREIGN PATENT DOCUMENTS

| | | | |
|---|---|---|---|
| JP | 201187429 A | 4/2011 | |
| WO | WO-2017024656 A1 * | 2/2017 | ............ H02M 1/44 |

* cited by examiner

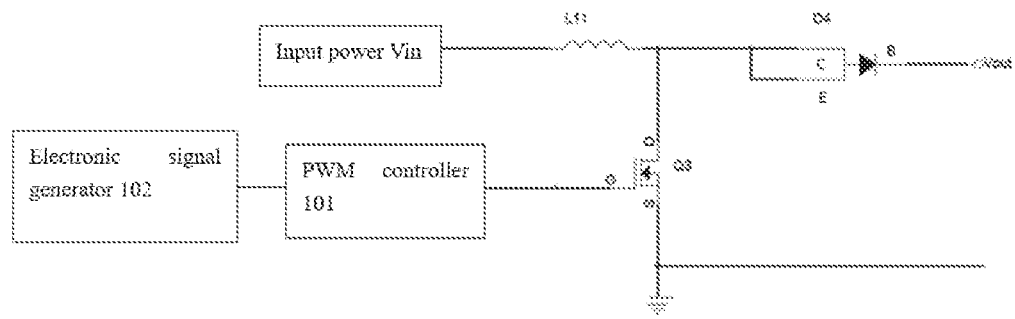

THIN FILM TRANSISTOR LIQUID CRYSTAL DISPLAY (TFT-LCD) AND THE DRIVING CIRCUIT AND SWITCHING POWER SUPPLY THEREOF

RELATED APPLICATIONS

The present application is a National Phase of International Application Number PCT/CN2018/094775, filed Jul. 6, 2018, and claims the priority of China Application No. 201810481375.2, filed May 18, 2018.

BACKGROUND

1. Technical Field

The present disclosure relates to power circuit field, and more particularly to a TFT-LCD and the driving circuit and the switching power supply thereof.

2. Description of Related Art

A direct circuit (DC)/DC converter circuit of a thin film transistor liquid crystal display (TFT-LCD) mostly uses a switching power supply. The switching power supply converts a higher DC voltage (such as 12V) into a lower DC voltage (such as 5V, 3.3V, 2.5V, etc.) for use in circuits such as microprocessors and image digital processors in the display.

After the circuit design is completed, the switching frequency of the switching power supply is maintained at a fixed frequency, and the switches in the entire DC/DC circuit will use the same switching frequency. Such a design is easy to make electromagnetic Interference (EMI) radiation at a single frequency to be larger. Due to the lower switching frequency, when the isolation of the power board of the whole machine is not well done, it will cause conduction problems.

SUMMARY

The present disclosure relates to a TFT-LCD, and the driving circuit and the switching power supply thereof to solve the greater EMI radiation issue and the conduction issues in the TFT-LCD circuit.

In one aspect, a switching power supply includes: a pulse width modulation (PWM) controller, an electronic signal generator, and a field effect transistor (FET); wherein output pins of the electronic signal generator being configured to output voltage signals that vary periodically between multiple voltage ranges; wherein frequency selection pins of the PWM controller and the output pins of the electronic signal generator are connected to receive the voltage signals from the electronic signal generator, and the PWM controller outputs switching signals of a predetermined frequency through at least one output pin according to a voltage range of the voltage signals received by the frequency selection pins; and wherein a gate pin of the FET connects to output pins of the PWM controller, and a source pin of the FET is grounded.

Wherein the voltage signals are square wave signals.
Wherein the voltage signals are clock signals.
Wherein the switching power supply further includes an inductor being connected in series between an input power source of the switching power supply and a drain pin of the FET.

Wherein the switching power supply further includes a crystal triode, a collector pin and an emitter pin of the crystal triode are connected to a drain pin of the FET, and a base pin of the crystal triode is connected to the output pin of the switching power supply.

Wherein the crystal triode is a PNP type crystal triode.
Wherein the voltage ranges includes a first voltage range and a second voltage range.
Wherein the first voltage range is 0 to 0.7V and the second voltage range is 2.7V to 3.3V; and/or the predetermined frequency corresponding to the first voltage range is 500 kHz, and the predetermined frequency corresponding to the second voltage range is 750 kHz.

In another aspect, the present disclosure also provides a driving circuit of TFT-LCDs, and the driving circuit includes the above switching power supply.

In another aspect, the present disclosure also provides a TFT-LCD, and the TFT-CD includes the above driving circuit.

According to the switching power supply of the present disclosure, electrical signals whose voltage periodically changes are inserted into a frequency pin of the PWM (PWM) controller, so that the frequency of the switching signals output by the PWM controller periodically changes. The switching power supply is prevented from using the switching signals of the same frequency for a long time, so that the EMI radiation of the circuit is reduced, and the conduction influence amount is reduced.

BRIEF DESCRIPTION OF THE DRAWINGS

In order to more clearly illustrate the embodiments of the present disclosure or prior art solutions, the drawings used in the description of the embodiments or prior art will be briefly described below. The drawings are merely some embodiments of the present disclosure, and those skilled in the art can also obtain other drawings based on these drawings without any creative work.

FIG. 1 is a schematic view of the circuit of the switching power supply in accordance with one embodiment of the present disclosure.

DETAILED DESCRIPTION

Following embodiments of the invention will now be described in detail hereinafter with reference to the accompanying drawings.

In the drawings, the thicknesses of layers and regions may be exaggerated for clarity. Same reference numerals refer to the same components throughout the specification and the drawings.

FIG. 1 is a schematic view of the circuit of the switching power supply in accordance with one embodiment of the present disclosure.

As shown in FIG. 1, the switching power supply includes a PWM controller 101, an electronic signal generator 102, and a field effect transistor (FET) (Q3).

The electrical signal generator 102 can be a variety of devices that can generate voltage signals that vary periodically between multiple voltage ranges. The electrical signal generator 102 can be an electrical signal generator specifically provided for the switching power supply, or an electrical signal generator shared by the switching power supply and a circuit using the switching power supply (for example, a TFT-LCD display circuit).

The electrical signal generator 102 outputs voltage signals that periodically changes between a plurality of voltage ranges through its output pin. In one embodiment, the plurality of voltage ranges are two voltage ranges, a first voltage range and a second voltage range, respectively. The voltage value in the first voltage range is less than the voltage value in the second voltage range. As an example, the first voltage range is 0 to 0.7V and the second voltage range is 2.7V to 3.3V.

The voltage signals can be square wave signal. For example, the voltage signal can be a clock signal in a square wave signal or other periodically varying signal.

The PWM controller 101 includes frequency selection pins (FSEL) and output pins.

The FSEL of the PWM controller 101 and the output pins of the electronic signal generator 102 are connected so as to receive the voltage signal from the electronic signal generator 102. The voltage signal periodically changes between a plurality of voltage ranges through its output pin.

The PWM controller 101 outputs a switching signal of a predetermined frequency through at least one output pin according to a voltage range of a voltage signal received by the FSEL pin. Specifically, the PWM controller 101 outputs a switching signal of a predetermined frequency corresponding to the voltage range of the voltage signal. Since the voltage signal periodically changes between a plurality of voltage ranges, the frequency of the switching signal output from the PWM controller 101 also periodically changes.

In an example, the plurality of voltage ranges includes the first voltage range and the second voltage range. When the voltage signal received by the PWM controller 101 through the frequency pin is in the first voltage range, the PWM controller 101 outputs a switching signal of a predetermined frequency corresponding to the first voltage range through the output pin; when the voltage signal received by the PWM controller 101 through the frequency pin is in the second voltage range, the PWM controller 101 outputs the switching signal of a predetermined frequency corresponding to the second voltage range via the output pins.

As an example, the predetermined frequency corresponding to the first voltage range is 500 kHz, and the predetermined frequency corresponding to the second voltage range is 750 kHz. That is, in the case where the plurality of voltage ranges includes the first voltage range and the second voltage range, the frequency of the switching signal output from the PWM controller 101 periodically jumps between 500 kHz and 750 kHz.

The gate pin G of the FET Q3 is connected to the output pin of the PWM controller 101, and the source pin S is grounded. Since the gate pin G of the FET Q3 is connected to the output pin of the PWM controller 101, that is, the gate pin G of the FET Q3 receives a switching signal of a predetermined frequency. The switching signal can control whether the conduction between the source pin S and drain D pin is turned on or off.

In another embodiment, the switching power supply further includes an inductor L11. The inductor L11 is connected in series between an input power source Vin of the switching power supply and the drain pin D of the FET Q3.

In addition, the switching power supply may further include a crystal triode D4. The collector pin C, the emitter pin of the crystal triode D4 are connected to the drain pin D of the FET Q3, and the base pin B of the crystal triode D4 is connected to the output pin Vout of the switching power supply. The crystal triode can be various types of crystal triodes. For example, the crystal triode is a PNP type crystal triode.

The present disclosure further provides a driving circuit of a TFT-LCD. The driving circuit includes the above switching power supply.

The present disclosure further provides a TFT-LCD including the above driving circuit.

In view of the above, an electrical signal whose voltage periodically changes is inserted at a frequency pin of the PWM controller, so that the frequency of the switching signal output by the PWM controller periodically changes. The switching power supply is prevented from using the switching signal of the same frequency for a long time, so that the EMI radiation of the circuit is reduced, and the conduction influence amount is reduced.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A switching power supply, comprising:
a pulse width modulation (PWM) controller, an electronic signal generator, and a field effect transistor (FET);
wherein an output pin of the electronic signal generator is configured to output a voltage signal that varies periodically between multiple voltage ranges, such that the multiple voltage ranges are sequentially assigned to the voltage signal;
wherein a frequency selection pin of the PWM controller and the output pin of the electronic signal generator are connected to receive the voltage signal from the electronic signal generator, and the PWM controller outputs a switching signal through at least one output pin according to the voltage signal of the electronic signal generator received by the frequency selection pin;
wherein a gate pin of the FET connects to output pin of the PWM controller, and a source pin of the FET is grounded;
wherein the switching signal output from the PWM controller varies periodically according to the periodic variation of the voltage signal output from the electronic signal generator and a frequency of the switching signal of the PWM controller varies periodically between multiple values respectively corresponding to the multiple voltage ranges of the voltage signal of the electronic signal generator, wherein a cycle of the multiple values of the frequency of the switch signal of the PWM controller is periodically repeated;
wherein the multiple voltage ranges comprise a first voltage range and a second voltage range and the voltage signal varies periodically between the first voltage range and the second range and a cycle of the first voltage range and the second voltage periodically repeated; and
wherein the first voltage range is 0 to 0.7V and the second voltage range is 2.7V to 3.3 V;
the frequency of the switching signal of the PWM controller corresponding to the first voltage range is 500 kHz, and the frequency of the switching signal of the PWM controller corresponding to the second voltage range is 750 kHz.

2. The switching power supply as claimed in claim 1, wherein the voltage signal is a square wave signal.

3. The switching power supply as claimed in claim 2, wherein the voltage signal is a clock signal.

4. The switching power supply as claimed in claim 1, wherein the switching power supply further comprises an inductor connected in series between an input power source of the switching power supply and a drain pin of the FET.

5. The switching power supply as claimed in claim 1, wherein the switching power supply further comprises a crystal triode, wherein a collector pin and an emitter pin of the crystal triode are connected to a drain pin of the FET, and a base pin of the crystal triode is connected to an output pin of the switching power supply.

6. The switching power supply as claimed in claim 5, wherein the crystal triode is a PNP type crystal triode.

7. A driving circuit of TFT-LCD, comprising:
   a switching power supply comprising a pulse width modulation (PWM) controller, an electronic signal generator, and a field effect transistor (FET);
   wherein an output pin of the electronic signal generator is configured to output a voltage signal that varies periodically between multiple voltage ranges, such that the multiple voltage ranges are sequentially assigned to the voltage signal;
   wherein a frequency selection pin of the PWM controller and the output pin of the electronic signal generator are connected to receive the voltage signal from the electronic signal generator, and the PWM controller outputs a switching signal through at least one output pin according to the voltage signal of the electronic signal generator received by the frequency selection pin;
   wherein a gate pin of the FET connects to output pin of the PWM controller, and a source pin of the FET is grounded;
   wherein the switching signal output from the PWM controller varies periodically according to the periodic variation of the voltage signal output from the electronic signal generator and a frequency of the switching signal of the PWM controller varies periodically between multiple values respectively corresponding to the multiple voltage ranges of the voltage signal of the electronic signal generator, wherein a cycle of the multiple values of the frequency of the switch signal of the PWM controller is periodically repeated;
   wherein the multiple voltage ranges comprise a first voltage range and a second voltage range and the voltage signal varies periodically between the first voltage range and the second range and a cycle of the first voltage range and the second voltage periodically repeated; and
   wherein the first voltage range is 0 to 0.7V and the second voltage range is 2.7V to 3.3 V;
   the frequency of the switching signal of the PWM controller corresponding to the first voltage range is 500 kHz, and the frequency of the switching signal of the PWM controller corresponding to the second voltage range is 750 kHz.

8. The driving circuit as claimed in claim 7, wherein the voltage signal is a square wave signal.

9. The driving circuit as claimed in claim 8, wherein the voltage signal is a clock signal.

10. The driving circuit as claimed in claim 7, wherein the switching power supply further comprises an inductor connected in series between an input power source of the switching power supply and a drain pin of the FET.

11. The driving circuit as claimed in claim 7, wherein the switching power supply further comprises a crystal triode, wherein a collector pin and an emitter pin of the crystal triode are connected to a drain pin of the FET, and a base pin of the crystal triode is connected to an output pin of the switching power supply.

12. The driving circuit as claimed in claim 11, wherein the crystal triode is a PNP type crystal triode.

13. A TFT-LCD, which comprises the driving circuit as claimed in claim 7.

* * * * *